United States Patent [19]

Gerich

[11] Patent Number: 5,127,547
[45] Date of Patent: Jul. 7, 1992

[54] METERING AND DISPENSING APPARATUS

[76] Inventor: Horst Gerich, 24034 Welby Way, Canoga Park, Calif. 91307

[21] Appl. No.: 646,390

[22] Filed: Feb. 19, 1991

[51] Int. Cl.⁵ ............................ B67D 5/08; B67D 5/52
[52] U.S. Cl. .............................. 222/55; 222/63; 222/137; 222/145; 222/334; 222/380
[58] Field of Search ................... 222/134–137, 222/145, 309, 334, 380, 389, 55, 56, 61, 63

[56] References Cited

U.S. PATENT DOCUMENTS

| | | | |
|---|---|---|---|
| 3,227,325 | 1/1966 | Bates | 222/334 X |
| 3,385,479 | 5/1968 | Austin, Jr. et al. | 222/334 X |
| 4,150,769 | 4/1979 | James | 222/334 X |
| 4,254,806 | 3/1981 | Elsworth | 222/380 X |
| 4,369,898 | 1/1983 | Andersson | 222/334 X |
| 4,515,296 | 5/1985 | Surdilla | 222/334 X |
| 4,566,612 | 1/1986 | von Kreuter | 222/309 |
| 4,662,540 | 5/1987 | Schroter | 222/55 |
| 4,830,219 | 5/1989 | Siemann | 222/55 |

Primary Examiner—Kevin P. Shaver
Attorney, Agent, or Firm—Kenneth J. Hovet

[57] ABSTRACT

A metering and dispensing machine that operates in accordance with the position of a cross-bar. The cross-bar is powered by a pneumatic cylinder and reciprocates two piston pumps that draw liquid from storage vessels during a back stroke. The liquid is expelled during a forward stroke through a valve and an outlet opening. The amount of liquid dispensed is determined by the pump chamber volume and pump piston draw distance. Each pump is removably secured directly to a valve block. To vary the ratio of liquids expelled from the pumps, at least one of the pumps is replaced with a larger or smaller pump. Each valve head includes a plug valve which is rotated from a fill position to a dispense position by an independent valve drive mechanism. The mechanism is actuated by sensor switches which are activated by predetermined positions of the cross-bar.

13 Claims, 2 Drawing Sheets

_5,127,547_

METERING AND DISPENSING APPARATUS

BACKGROUND OF THE INVENTION

1. Field of the Invention

The present invention pertains to machines that can pump predetermined amounts of fluids at a preset pressure to a dispensing device.

2. Description of Related Art

Of particular importance in the use of catalyst activated resin or polymer systems, is the accurate metering of reactive components just prior to their end use application. Such application may occur on the outside of high-rise office buildings, in a pharmaceutical laboratory, in a boat manufacturing facility or out on a public highway or city street. In all cases, it is imperative that the device used to meter and dispense the fluids be compact, durable and highly reliable under all conditions and with all fluids.

Machines used in the prior art oftentimes use two or more independently operated pumps controlled by electronic timing devices, solenoids and switching mechanisms. Use of such multiple intervening control devices create many opportunities for misadjustment or malfunction. This, in turn, limits the machine versatility and detrimentally affects reliability.

An example of the above is described in U.S. Pat. No. 4,828,148. There, fluid is pressurized into separate opposing piston chambers. As the chambers fill, piston rods move outwardly against a cam. The cam actuates a switch which activates a motor that raises a triangular-shaped metering cam against the piston rods. As the metering cam forces the rods back into the chambers, fluid will be expelled from each chamber. The amount of material expelled is controlled by the distance of return stroke of the pistons. The stroke distance, in turn, depends on the slope of the metering cam edges.

Not only is the above system susceptible to malfunction because of its dependence on two cams and multiple control devices for operation, it also relies on an external source to pressurize the fluid into and through the system. This is cumbersome and undesirable for many uses such as in-situ applications.

An attempt to overcome the above deficiencies is shown in U.S. Pat. No. 4,228,924. There, a single driver plate is used to move three piston pumps. Each of the pump chambers are filled with a pressurized fluid component until the piston rods contact a switch. The switch actuates a powered actuator which pushes the driver plate and associated piston rods upwardly to discharge the fluid in each chamber. The fluids pass through synchronized three-way ball valves and a check valve. They are then mixed and discharged.

A significant problem with the above machine is that the piston rods are allowed to slip relative to the driver plate. This creates volumetric uncertainty in the discharge flow and potential offsets in the timing of valve movements. Such problems necessitate the use of downstream check valves to avoid pressure differentials and backflow from the mixer. Also, the pistons are clearly not designed to provide significant pumping pressure and are primarily used for metering purposes.

SUMMARY OF THE INVENTION

The machine of the present invention provides a dual piston chamber pumping system that is both driven and actuated from a cross-bar. This feature provides significant assurance of precision operation and accurate metering under all conditions and with all types of fluids.

The piston rods are detachably secured to the cross-bar and a pump drive means supplies the pumping force via the cross-bar. This allows each piston/chamber to operate as a normal reciprocating high pressure pump and also insures that each pump will operate exactly alike. Exchangeable chambers and adjustable stroke lengths provide for great latitude in metering capability.

Attached to each pump chamber is a valve block containing a valve which includes a diversion through channel. During a back stroke, the through channel provides communication between a fill opening in the block and the pump chamber. During a forward stroke, the valve is rotated so the through channel provides communication between the pump chamber and a discharge outlet.

Use of a valve block with predetermined flow channels obviates the prior art need for control valves, check valves and extraneous piping. Such items were manifested in the aforementioned patents along with the associated circuitry, actuators and pressurized flow systems.

The valve in each block is operated by a valve drive means which is actuated by the location of the cross-bar. Sensor means adjustably positioned at the end of the back stroke and forward stroke provide a signal to the valve drive means for rotating the valves. The sensors are also in communication with an adjustable timer means. The timer means regulates activation of the pump drive means in synchronization with cross-bar movement upon receipt of signals from pressure sensors at an outlet dispensing means.

DESCRIPTION OF THE PREFERRED EMBODIMENTS

Figure 1:
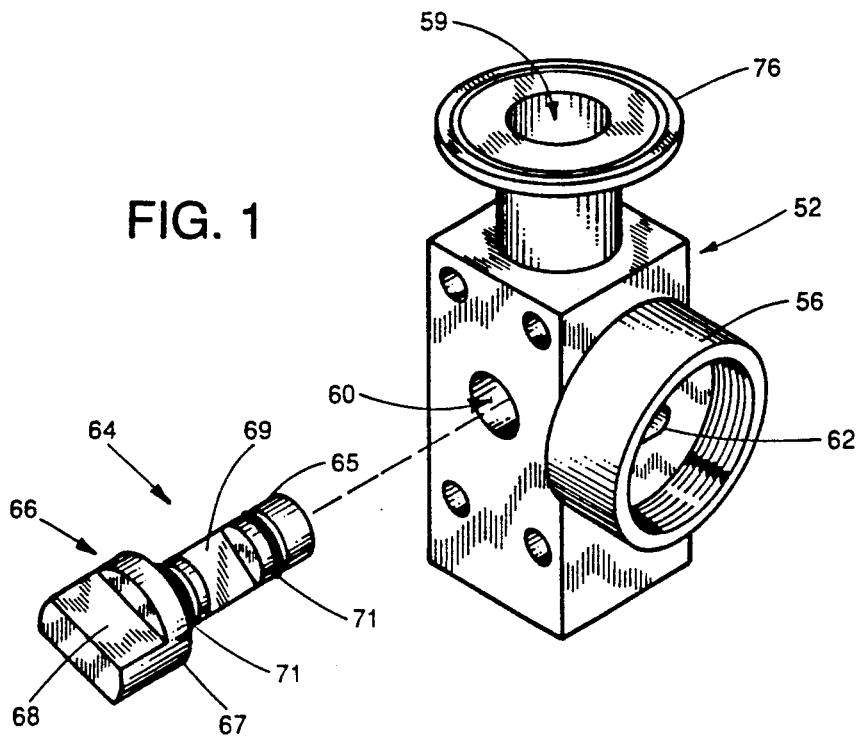
FIG. 1 is an isometric view of a valve block with an exploded valve used in conjunction with the invention.
Figure 2:
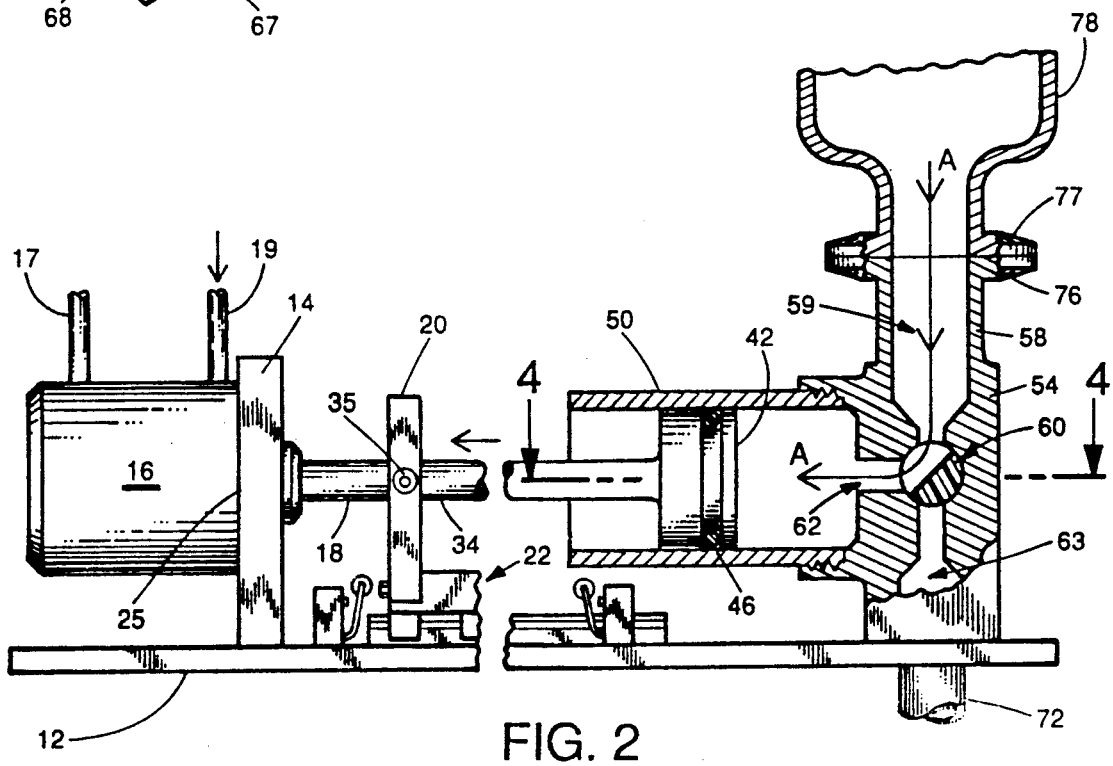
FIG. 2 is a side elevational view of a metering and dispensing apparatus constructed in accordance with the invention showing a partial cross-section of a fluid storage vessel, valve block, valve and piston chamber during a back stroke fill cycle.
Figure 3:
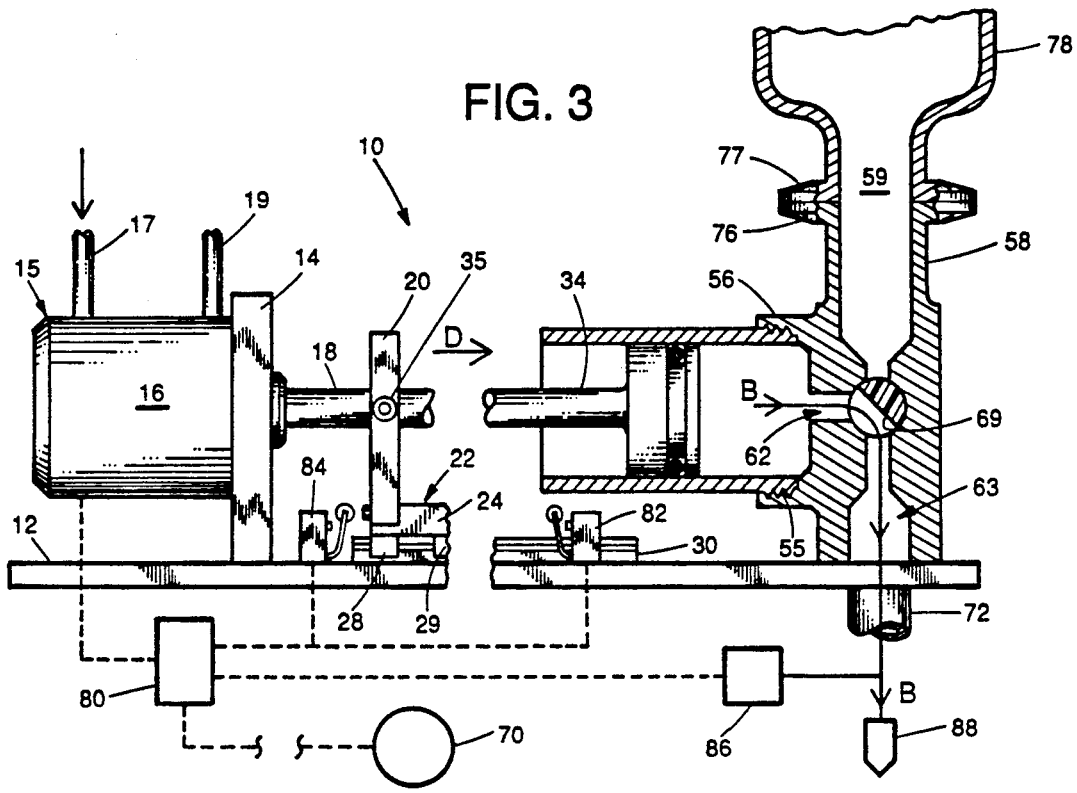
FIG. 3 is the same view and apparatus of FIG. 2 showing a forward stroke discharge cycle and schematic control means for an overall dispensing system.
Figure 4:
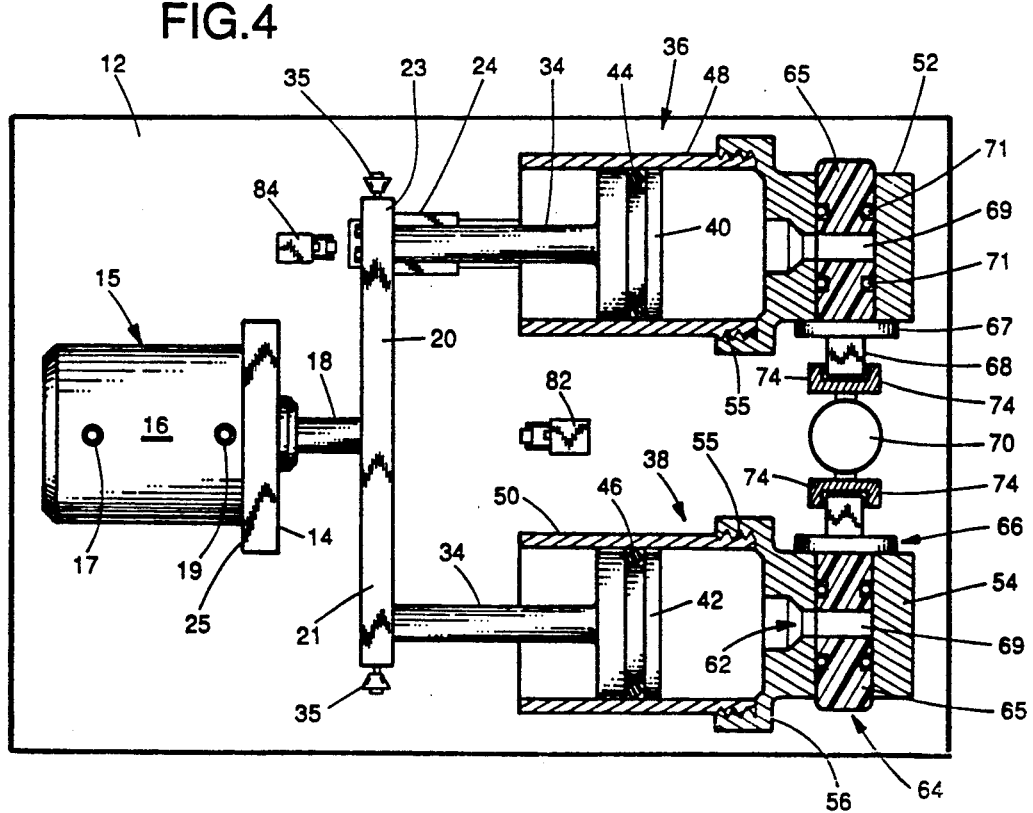
FIG. 4 is a top plan view of the apparatus of FIGS. 2-3 with a partial cross-sectional view taken along lines 4—4 of FIG. 2.

With particular reference to FIGS. 2-4 of the drawings, an illustrative embodiment of the overall invention is referenced by numeral 10. A platform or base 12 is used to support and secure the various components of the apparatus. The platform may be provided with legs or wheels for in-situ ease of use and mobility.

Upstanding from the platform is a support means shown as pedestal 14. The pedestal is fixed to the base across a major portion of the base width. It comprises a thick plate having an opening (not shown) extending through about its midpoint.

Attached to the pedestal is a pump drive means shown as pneumatic cylinder 15. Other devices equivalent to the pneumatic cylinder for use with the invention would be a hydraulic cylinder or an electric motor with an axially extendable shaft.

As is known, the air cylinder includes an outer housing 16 and a reciprocable cylinder shaft 18. Air pressure at rear duct 17 forces the shaft outwardly and air pressure at front duct 19 causes the shaft to retract inwardly. Front end 25 of the outer housing is secured to the pedestal at the aforementioned opening. Most conveniently, the front end may threadably engage corresponding threads about the opening.

Cylinder shaft 18 extends from the central opening and is secured at its outer end to about the midsection of cross-bar 20. The cross-bar is elevated above the base and reciprocates directly with the shaft. It consists of a strong thick plate that is substantially inflexible and resistant to torsional forces. The cross-bar has opposing outer end portions 21,23.

For added stability and to avoid canting under heavy loads, at least one outer end of the cross-bar may include an optional guide means 22. As shown, the guide means includes a connector block 24 securely fastened to outer end portion 23.

Attached to the underside of the connector block are two offset roller parts 28,29. The roller parts are slidably attached to a track means shown as linear guide strip 30. The guide strip is secured to base 12 in alignment with the direction of movement of the cross-bar. It extends in length at least equal to the overall distance of cross-bar reciprocation. The guide means substantially eliminates unwanted deflection, twisting and canting of the cross-bar about its connection with cylinder shaft 18.

Also secured to the cross-bar outer end portions are piston rods 32,34 of first and second pump means 36,38. The rods extend from their distal end substantially perpendicularly from a side of the cross-bar opposite from the drive shaft.

The distal ends are set in cross-bar recesses and include pin openings for detachable securement by stay pins 35 which are known in the art. The stay pins extend through the pin openings and corresponding intersecting passages in the cross-bar.

For proper balance and uniform thrust, the rods are preferably equally spaced-apart from the cylinder shaft midsection connection. This results in a corresponding equal bilateral spacing between the pump means.

At their proximal ends, the rods connect with corresponding first and second piston heads 40,42. Each head includes a sidewall annular groove containing an O-ring 44,46. The rings provide a high pressure sealing engagement with the inner walls of corresponding pump chambers 48,50.

The piston heads reciprocate within corresponding first and second pump chambers which are releasably secured to first and second valve head blocks 52,54. Each block and chamber are provided with corresponding releasable securement means for easy disengagement. As shown, the releasable securement means comprises matching threads 55.

An advantageous feature of the invention is that since the chambers and rods are removable, either one or both can be exchanged and/or replaced with larger or smaller units. This allows for versatility in handling fluids that must be combined in predetermined ratios. Another significant feature is that the direct connection of the pump chambers to an associated valve block avoids extraneous piping, minimizes pressure drop and eliminates loss of material during change-overs.

Each of the valve head blocks is secured to the base outwardly from each pump means. Each block includes a pipe ring 56 with internal threads for connection with corresponding external threads on respective pump chambers.

Each block also includes a fluid supply connector means. As shown, this includes a short pipe 58 which terminates with a flat faced flange 76. The flange sealingly engages a corresponding supply source connector means shown as matching flange 77. The matching flange extends radially outwardly about the outlet of vessel 78. External clamping means known in the art may be used to securely interconnect the flanges and lock the vessel to the valve block.

It can be appreciated that different sizes and types of vessels may be used with each of the piston pump means. In some cases, the vessel may be replaced with a hose and flange connector means known in the art for directly accessing an external source of fluid.

The inlet pipe defines inlet channel 59 which intersects with a valve bore 60. As shown, the valve bore comprises a cylindrical opening that traverses the central part of the entire width of the valve block.

Extending orthoganally from the inlet channel and valve bore intersection is pump chamber channel 62. This channel is preferably in alignment with the center axis of the pump chamber and may be oblong in cross-section to facilitate laminar flow.

Extending downwardly below the bore intersection, in alignment with the inlet channel, is discharge outlet 63. The outlet is a cylindrical passage that provides communication with the pump chamber. It connects with an outlet pipe 72 which extends through base 12. The outlet pipe communicates with a schematically depicted pressure sensor 86 and dispensing means 88 for end use application of the dispensed fluid. Such dispensing means may comprise mixing means, a dispensing gun, nozzle or any other means known in the art as dictated by the intended use of the apparatus.

Extending through valve bore 60 is a valve 64. The valve comprises a solid generally cylindrically-shaped part having a straight cylindrical valve shaft 65. The valve shaft is rotatable within the bore. One end of the shaft outside the bore is an enlarged head section 66. The head section includes an abutment boss 67 and an axially extending flattened engagement structure 68 for linkage with a valve drive means 70.

About midpoint of the valve shaft is a through channel comprising a transversly extending recessed diverter area 69. The area is preferably planar and can be characterized as a notch-like channel that cuts into about one-half the shaft diameter. The area extends about parallel with the longitudinal axis of the shaft. O-rings 71 on opposing sides of the diverter area are used to prevent leakage of fluids passing through the valve channels.

When the valve shaft is fully extended through the bore, i.e., the abutment boss is against the valve block, the diverter area will be in alignment with the inlet channel, discharge outlet and the pump chamber channel. In this manner, when the diverter area faces obliquely inward and upward as shown in FIG. 2, material will flow into the pump chamber as shown by arrows "A". When the diverter area faces obliquely inward and downward as shown in FIG. 3, material will flow as shown by arrows "B".

It is preferred that the first and second valve of respective first and second valve blocks will rotate in unison in the same axial direction so that flow will occur in the same direction on both of the first and second pumping means. To effect this movement, the aforementioned valve drive means 70 is utilized.

The drive means is most conveniently secured to base 12 between the valve blocks. For stability, it may also be attached to each of the blocks. It includes a known inner drive assembly and a housing with linkage means, shown as bifurcated arms 74, extending from opposite sides of the housing. The arms are spaced-apart a distance about equal to the thickness of head section engagement structure 68. In this manner, they can releasably engage the sides of the structure and transfer rotational force from the valve drive means to each of the valves 64. A Whity #131DA double acting 90 degree actuator is an example of a valve drive means suitable for use with the present invention. This actuator is available from Whity Co. of Highland Heights, Ohio.

The valve drive means preferably operates by known pneumatic drive means but could also be powered by hydraulic or electrical means. It is adjustably synchronized with a timer means shown schematically by box 80. The timer means is activated by the pressure sensor 86 at the dispensing outlet and operates the overall pumping cycle. Pneumatically operated timer means suitable for use with the invention is a Miller #151 4-way timer or a Crouzet timer #81 532001. Both of the above are supplied by Miller Fluid Products of Bensenville, Ill.

Operating in conjunction with the timer means is a cross-bar sensor means. The sensor means is used to detect the position of cross-bar 20 at the beginning and end of each pumping stroke.

As shown, the sensor means comprise a forward switch 82 which is adjustably positioned on the base 12 for contact with the cross-bar when a piston head reaches its forwardmost point in the pump chamber. A rearward switch 84 is adjustably secured to the base for contact with the cross-bar when a piston head reaches its rearwardmost point in the pump chambers.

When the cross-bar contacts either of the switches, they will transmit a signal to the timer means. In accordance with a desired preset sequence, the timer will activate the valve drive means for rotating the valves to the desired orientation. Thereafter, the timer will activate the pump drive means for movement of the piston heads.

Most conveniently, the overall system is operated with an external source of air pressure (not shown). The air is used to power the pump drive means and the valve drive means. The same source of air may also be used for transmitting signals from switches 82,84 to the timer means.

In a manner known in the art, a dispensing control valve and pressure sensor 86 can be used to control flow of the fluids from the apparatus. The valve and sensor may be part of a dispensing means such as a resin dispensing gun or a vial injector.

The pressure sensor is used for detecting a predetermined pressure upstream from the dispensing control valve. When the dispensing valve is opened and the line pressure falls below a preset amount, the sensor will signal the timer means to actuate a pumping cycle. The cycle will continue until the desired pressure is reestablished at the dispensing outlet or valve. This will function to maintain a constant pressure at the dispensing outlet and provide for an even flow rate of fluid from the machine.

In describing a cycle beginning with the fill step, the valves will be axially rotated so that the diverter area is inclined upwardly as shown in FIG. 2. Such preset orientation is caused by the cross-bar moving against switch 82 which signalled the timer. The timer, in turn, activated the valve drive means to move the valves into their fill position.

During the piston head backstroke as shown by arrow "C", material from respective fluid sources, such as storage vessels 78, will be drawn into the corresponding pump chambers. When the piston head moves to the desired backstroke position, the rearward switch 84 will be contacted by the cross-bar. Such contact will activate the timer which will signal the valve drive means to rotate the valves and cause the diverter area to be inclined downwardly. This allows communication between the pump chamber channel and the discharge outlet.

Subsequent to the above valve rotation, the timer will activate the pump drive means to reverse the axial force on shaft 18 and cause the cross-bar and piston rods to move forward as shown by arrow "D". When the piston head moves forward, all material will be forced out of the chamber past the diverter area and out the discharge channel. At the preset termination of the forward stroke, the cross-bar will contact switch 82 and the cycle will start over.

As above-described, two fluids may be discharged for subsequent mixing and dispensing from a terminal device. Alternatively, the fluids may simply be dispensed and collected separately in predetermined metered amounts.

Although not as efficient or advantageous, a further alternative would be to use just one piston pump rather than two. In this case, the connector rod would preferably be attached to the cross-bar adjacent its connection with the guide means. All other components would function as hereinabove described.

While the invention has been described with respect to preferred embodiments, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A machine for pumping predetermined volumes of fluid to a dispensing device, comprising:

a platform with an upstanding support;

a pump drive means attached to said support having a reciprocating drive shaft for supplying force to a cross-bar, said drive shaft having a free end which is connected to said cross-bar;

a pump means comprising a piston head and piston rod reciprocating within a pumping chamber for drawing in and discharging out a predetermined volume of said fluid, said piston rod having a distal end attached to said cross-bar;

a valve block attached to said pumping chamber having a valve bore intersected with an inlet channel, a pump chamber channel and a discharge outlet;

a rotatable valve having a shaft portion extending into said bore, said shaft having a through channel providing communication with either said inlet channel and pump chamber channel or said pump chamber channel and said discharge outlet;

a valve drive means connected to said rotatable valve for orienting said through channel in response to the position of said cross-bar;

a pressure sensor means for sensing fluid pressure at the dispensing device and for generating a fluid pressure signal;

a timer means connected to said pressure sensor means for activating said pump drive means in response to said fluid pressure signal at the dispensing device; and, a sensor means for detecting the position of said cross-bar and signaling said timer means to reverse the direction of said cross-bar while also signaling said timer means to actuate said valve drive means for changing the orientation of said through channel.

2. The machine of claim 1 including releasable securement means for releasable attachment of said pumping chamber to said valve block means.

3. The machine of claim 2 wherein said piston rod distal end is releasably attached to said cross-bar.

4. The machine of claim 1 wherein said valve block means includes a fluid source connector means for providing communication between a source of supply fluid and said inlet channel.

5. An apparatus for pumping and metering fluids to a dispensing outlet, comprising:

a base;

pump drive means secured to said base for supplying force to a cross-bar, said pump drive means having a reciprocable shaft connected to said cross-bar;

a first pump means connected to said cross-bar for receiving and discharging a predetermined quantity of fluid, said first pump means including a first valve having a through channel which is movable to provide communication between a fill opening and pump chamber and between said pump chamber and a discharge outlet;

a second pump means connected to said cross-bar for receiving and discharging a predetermined quantity of fluid, said second pump means including a second valve having a through channel which is movable to provide communication between a fill opening and pump chamber and between said pump chamber and a discharge outlet;

sensor means comprising a back stroke sensor and a forward stroke sensor which detect predetermined positions of said bar;

a pressure sensor means for sensing fluid pressure at the dispensing outlet and for generating a fluid pressure signal;

timer means which receives signals from said pressure sensor means and actuates said pump drive means for causing movement of said cross-bar, said timer means also receiving signals from said sensor means for reversing the direction of said cross-bar; and, valve drive means actuated by said timer means in response to a signal from said sensor means for moving said first and second valves in synchronization with said cross-bar position.

6. The apparatus of claim 5 wherein each of said first and second pump means includes a corresponding piston reciprocable within a chamber.

7. The apparatus of claim 6 including a first and second valve head block secured to a respective chamber containing a corresponding first and second valve.

8. The apparatus of claim 5 wherein each of said first and second valves includes an axially extending head section, said valve drive means including a linkage means for engagement with a corresponding head section.

9. The apparatus of claim 6 wherein each of said first and second pump means includes a rod having a proximal end secured to a respective piston and a distal end releasably attached to said cross-bar.

10. The apparatus of claim 7 wherein each of said chambers and valve head blocks include releasable securement means for permitting detachment of a chamber from a respective valve block.

11. The apparatus of claim 6 wherein said fill opening comprises an inlet channel and each of said valve head blocks includes a cross bore which is orthogonally intersected by said inlet channel and a pump chamber channel and a discharge outlet.

12. The apparatus of claim 11 wherein said inlet channel includes a fluid source connector means for detachable connection between each valve head block and a fluid supply source.

13. The apparatus of claim 5 wherein said cross-bar includes a guide means to avoid canting under heavy loads comprising a track means secured to said base in alignment with the direction of movement of said cross-bar and a connector block slidably attached to said track means and secured to at least one end portion of said cross-bar.

* * * * *